(12) United States Patent
Calvin, III (10) Patent No.: US 10,920,132 B2
(45) Date of Patent: Feb. 16, 2021

(54) PRESSURE DEPENDENT LEAK-OFF MITIGATION IN UNCONVENTIONAL FORMATIONS

(71) Applicant: HALLIBURTON ENERGY SERVICES, INC., Houston, TX (US)

(72) Inventor: James Eldon Calvin, III, Oklahoma City, OK (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 184 days.

(21) Appl. No.: 16/089,501

(22) PCT Filed: Jun. 9, 2016

(86) PCT No.: PCT/US2016/036671
§ 371 (c)(1),
(2) Date: Sep. 28, 2018

(87) PCT Pub. No.: WO2017/213656
PCT Pub. Date: Dec. 14, 2017

(65) Prior Publication Data
US 2020/0299571 A1    Sep. 24, 2020

(51) Int. Cl.
*E21B 43/267*    (2006.01)
*C09K 8/80*    (2006.01)
(Continued)

(52) U.S. Cl.
CPC .......... *C09K 8/80* (2013.01); *C09K 8/72* (2013.01); *E21B 43/267* (2013.01); *E21B 43/27* (2020.05)

(58) Field of Classification Search
None
See application file for complete search history.

(56) References Cited

U.S. PATENT DOCUMENTS

| 4,509,598 A * | 4/1985 | Earl | ..... C09K 8/62 166/308.2 |
| 8,607,870 B2 | 12/2013 | Gu et al. | |

(Continued)

FOREIGN PATENT DOCUMENTS

| WO | WO2014/022587 | 2/2014 |
| WO | WO2015/041690 | 3/2015 |

(Continued)

OTHER PUBLICATIONS

Canadian Intellectual Property Office, Canadian Examiner's Letter issued for Canadian Patent Application No. 3,017,115, dated Jun. 18, 2019, 3 pages.

(Continued)

*Primary Examiner* — Andrew Sue-Ako
(74) *Attorney, Agent, or Firm* — Haynes and Boone, LLP (57) ABSTRACT

Methods for reducing pressure dependent leak-off (PDL) in PDL fractures of an unconventional subterranean formation are described. The methods include introducing a first fluid including micro-proppant particulates into the formation, allowing a portion of the micro-proppant particulates in the first fluid to seal one or more PDL fractures in the formation, pumping an acid into the formation, allowing a portion of the micro-proppant particulates in the first fluid to divert a flow of at least a portion of the acid from the PDL fractures to a primary fracture, introducing a second fluid including micro-proppant particulates into the formation, and allowing a portion of the micro-proppant particulates in the second fluid to seal one or more PDL fractures in the formation.

20 Claims, 5 Drawing Sheets

(51) Int. Cl.
  *E21B 43/27* (2006.01)
  *C09K 8/72* (2006.01)

(56) References Cited

U.S. PATENT DOCUMENTS

| | | | |
|---|---|---|---|
| 8,613,314 | B2 | 12/2013 | Garcia-Lopez De Victoria et al. |
| 2013/0025860 | A1* | 1/2013 | Robb .................. C09K 8/035 166/279 |
| 2013/0264054 | A1 | 10/2013 | East et al. |
| 2013/0284437 | A1 | 10/2013 | Nguyen et al. |
| 2014/0034309 | A1* | 2/2014 | Saini .................. E21B 43/267 166/280.1 |
| 2014/0251626 | A1 | 9/2014 | Gomaa et al. |
| 2014/0262291 | A1 | 9/2014 | Chen et al. |
| 2014/0299318 | A1 | 10/2014 | Crews et al. |
| 2014/0299326 | A1 | 10/2014 | Crews |
| 2015/0041132 | A1 | 2/2015 | Nelson et al. |
| 2016/0053160 | A1* | 2/2016 | Nguyen ............... C09K 8/5751 166/308.5 |
| 2016/0076352 | A1 | 3/2016 | Nguyen et al. |

FOREIGN PATENT DOCUMENTS

| | | | | |
|---|---|---|---|---|
| WO | WO2015038153 | | 3/2015 | |
| WO | WO 2015/069293 | * | 5/2015 | .............. E21B 43/22 |

OTHER PUBLICATIONS

International Preliminary Search Report on Patentability issued for International Patent Application No. PCT/US2016/036671, dated Dec. 11, 2018, 7 pages.

M.P. Cleary, et al., Filed Implementation Of Proppant Slugs To Avoid Premature Screen-Out Of Hydraulic Fractures With Adequate Proppant Concentration, SPE 25892, Society of Petroleum Engineers, SPE Rocky Mountain Region/Low Permeability Reservoirs Symposium, Denver, Colorado, USA, Apr. 12-14, 1993, 16 pgs.

B.W. McDaniel, et al., Proper Use of Proppant Slugs and Viscous Gel Slugs Can Improve Proppant Placement During Hydraulic Fracturing Applications, SPE 71661, Society of Petroleum Engineers, 2001 SPE Annual Technical Conference and Exhibition, New Orleans, Louisiana, Sep. 30-Oct. 3, 16 pgs.

A.J. Cote, et al., Case Study: Mixing Proppant Sizes To Control Pressure-Dependent Leakoff, SPE 108178, Society of Petroleum Engineers, SPE Rocky Mountain Oil & Gas Technology Symposium, Denver, Colorado, USA, Apr. 16-18. 2007, 6 pgs.

M.Y. Soliman et al., Fracturing Design Aimed at Enhancing Fracture Complexity, SPE 130043, Society of Petroleum Engineers, SPE EUROPE/EAGE Annual Conference and Exhibition, Barcelona, Spain, Jun. 14-17, 2010, 20 pgs.

Rick Gdanski, Numerical Study of PDL-Induced Fracture-Face Damage Using a Fracturing Mimicator, SPE 132918, Society of Petroleum Engineers, SPE Asia Pacific Oil & Gas Conference and Exhibition, Brisbane, Queensland, Australia, Oct. 18-20, 2010, 15 pgs.

Fraser McNeil et al., New Multistage Fracturing Process Offers Real-Time Control of Rate and Proppant Concentration at the Perforations, SPE 162827, Society of Petroleum Engineers, SPE Canadian Unconventional Resources Conference, Calgary, Alberta, Canada, Oct. 30-Nov. 1, 2012, 9 pgs.

Stanchits, S. et al., Monitoring the Early Onset of Hydraulic Fracture Initiation by Acoustic Emission and Volumetric Deformation Measurements, ARMA 13-664, American Rock Mechanics Association, 47th US Rock Mechanics/Geomechanics Symposium, San Francisco, CA, USA, Jun. 23-26, 2013, 9 pgs.

Muthukumarappan Ramurthy, et al., Effects of High Pressure-Dependent Leakoff (PDL) and High Process-Zone Stress (PZS) on Stimulation Treatments and Production, SPE167038, Society of Petroleum Engineers, SPE Unconventional Resources Conference and Exhibition—Asia Pacific, Brisbane, Australia, Nov. 11-13, 2013, 14 pgs.

Stephen R. Ingram, et al., Methods Improve Stimulation Efficiency of Perforation Clusters in Completions, SPE-0414-0032-JPT, Technology Update, JPT, 2014 J Pet. Tech. 66(4) 32-26, Apr. 2014, 4 pgs.

C. Kraemer et al., A Novel Completion Method for Sequenced Fracturing in the Eagle Ford Shale, SPE-169010-MS, Society of Petroleum Engineers, SPE Unconventional Resources Conference, The Woodlands, Texas, USA, Apr. 1-3, 2014, 10 pgs.

Nimish Pandya et al., Rate Step-Down Analysis Improves Placement Efficiency of Stimulation Treatments in Unconventional Resource Play, URTeC: 1943637, Unconventional Resources Technology Conference DOI.10.15530/urtec-2014-1943637, Unconventional Resources Technology Conference, Denver, Colorado, USA, Aug. 25-27, 2014, 10 pgs.

Jeff Dahl, et al., Application of Micro-Proppant to Enhance Well Production in Unconventional Reservoirs: Laboratory and Field Results, SPE-174060-MS, Society of Petroleum Engineers, SPE Western Regional Meeting, Garden Grove, California, USA, Apr. 27-30, 2015, 19 pgs.

International Search Report and Written Opinion issued by the Korean Intellectual Property Office for International Application No. PCT/US2016/036671 dated Mar. 7, 2017. (11 pages).

* cited by examiner

PRESSURE DEPENDENT LEAK-OFF MITIGATION IN UNCONVENTIONAL FORMATIONS

CROSS-REFERENCE TO RELATED APPLICATION

The present application is a U.S. National Stage patent application of International Patent Application No. PCT/US2016/036671, filed on Jun. 9, 2016, the benefit of which is claimed and the disclosure of which is incorporated herein by reference in its entirety.

BACKGROUND

The present invention relates generally to reducing pressure dependent leak-off (PDL) in secondary fractures of unconventional formations. In particular, the present invention relates to methods of reducing PDL in secondary fractures using a micro-proppant that functions as a diverting agent.

Hydraulic fracturing is a primary tool for improving well productivity by placing or extending channels from the wellbore to the reservoir. This operation is essentially performed by hydraulically injecting a fracturing fluid into a wellbore penetrating a subterranean formation and forcing the fracturing fluid against the formation strata by pressure. The formation strata or rock is forced to crack and fracture. Proppant is placed in the fracture to prevent the fracture from closing and thus, provide improved flow of the recoverable fluid, i.e., oil, gas or water.

In certain low permeability or unconventional formations, such as shale reservoirs and tight sandstone, hydraulic fracturing not only forms primary or dominant fractures in the near field near the wellbore, but also forms secondary dendritic fractures in the far field extending from the primary fractures. These secondary fractures are generally formed at the tip and edges of the primary fractures and extend outwardly in a branching tree like manner from the primary fractures.

One issue encountered in hydraulic fracturing is the presence of PDL. PDL is usually associated with a secondary fracture network or branch fracture network that can be initiated near wellbore or far-field. These fractures are too small for conventional small proppants that are sized at 100 mesh or 40/70 mesh to enter and prop them open, and/or to provide any fluid loss reduction mitigation into them. These secondary fractures often times require higher pressures to remain open than dominant hydraulic fractures. Once they are opened, the secondary fractures will take liquid from the dominant hydraulic fractures.

Without sufficient fluid to propagate, the dominant hydraulic fracture growth will be stunted, and in situations of extremely high pressures, full treatment rate will never be achieved. Moreover, in tight sandstone or other unconventional formations, a HF (hydrofluoric acid)/HCl (hydrochloric acid) mixture, an HCl mixture, or straight HCl is often utilized to help initiate hydraulic fractures. HF has the ability to dissolve the quartz/sand content in unconventional reservoirs, and HCl has the ability to dissolve carbonates (limestone and dolomite). Because of their dissolving power, HF and HCl will exacerbate the PDL.

Thus, PDL is a significant issue in unconventional formations. PDL often reduces how efficiently stimulation treatment stages are completed. This means that it often takes significantly longer to complete stages on wells. Both operators and service companies can lose money because of such delays. Thus, there is a continuing need for improved methods for minimizing the effect of secondary PDL fractures in unconventional formations.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

According to several exemplary embodiments, the methods of the present invention utilize micro-proppant as a bridging agent to prevent fluid loss into the secondary PDL fracture network in situations where an acid (e.g., straight acid or an acid mixture) is utilized. The micro-proppant can either be pumped ahead of the acid, behind the acid, or both. Other large proppants such as 100 mesh proppant can be used in conjunction with the micro-proppant.

According to several exemplary embodiments, a method of reducing pressure dependent leak-off (PDL) in PDL fractures of an unconventional subterranean formation is provided. The method includes introducing a first fluid including micro-proppant particulates into the formation via a wellbore, allowing a portion of the micro-proppant particulates in the first fluid to seal one or more PDL fractures in the formation, pumping an acid into the formation via the wellbore, allowing a portion of the micro-proppant particulates in the first fluid to divert a flow of at least a portion of the acid from the PDL fractures to a primary fracture, introducing a second fluid including micro-proppant particulates into the formation via the wellbore, and allowing a portion of the micro-proppant particulates in the second fluid to seal one or more PDL fractures in the formation.

According to several exemplary embodiments, the micro-proppant particulates include ceramic microspheres. The ceramic microspheres are sized to fit within the small PDL fractures. For example, the ceramic microspheres have a diameter that is less than 149 μm or 74 μm.

According to several exemplary embodiments, the acid includes an acid mixture, such as hydrochloric acid and hydrofluoric acid, or a hydrochloric acid mixture. According to several exemplary embodiments, the acid includes only hydrochloric acid. In other words, straight hydrochloric acid is used.

According to several exemplary embodiments, the micro-proppant particulates are introduced into the formation using any suitable fluid, such as a pad fluid. According to several exemplary embodiments, the micro-proppant particulates are present in the fluid at any suitable concentration, such as about 0.1 parts per gallon (ppg).

According to several exemplary embodiments, the method further includes introducing a fracturing fluid into the formation via the wellbore after allowing a portion of the micro-proppant particulates in the second fluid to seal one or more PDL fractures in the formation. According to several exemplary embodiments, the fracturing fluid includes proppants having a diameter of at least 149 µm.

According to several exemplary embodiments, the method further includes slurrying the micro-proppant particulates in the first fluid, the second fluid, or both, in a gel before introducing the first fluid, second fluid, or both into the formation. According to several exemplary embodiments, a pump is used to introduce the first fluid, second fluid, or both, into the wellbore.

According to several exemplary embodiments, another method of reducing pressure dependent leak-off (PDL) in PDL fractures of an unconventional subterranean formation is provided. The method includes pumping a fluid into the formation via a wellbore to produce one or more fractures in the formation, wherein the fractures include primary fractures and PDL fractures, introducing a first fluid including ceramic micro-proppant particulates into the formation via a wellbore, allowing a portion of the ceramic micro-proppant particulates in the first fluid to seal one or more PDL fractures in the formation, pumping an acid mixture into the formation via the wellbore, allowing a portion of the ceramic micro-proppant particulates in the first fluid to divert a flow of at least a portion of the acid mixture from the PDL fractures to a primary fracture, introducing a second fluid including ceramic micro-proppant particulates into the formation via the wellbore, and allowing a portion of the ceramic micro-proppant particulates in the second fluid to seal one or more PDL fractures in the formation.

According to several exemplary embodiments, the ceramic micro-proppant particulates have a diameter that is less than 149 µm. According to several exemplary embodiments, the ceramic micro-proppant particulates have a diameter that is less than 74 µm. According to several exemplary embodiments, the ceramic micro-proppant particulates are present in the first fluid, the second fluid, or both, at a concentration of about 0.1 parts per gallon (ppg).

According to several exemplary embodiments, the acid mixture includes hydrochloric acid and hydrofluoric acid. According to several exemplary embodiments, the acid mixture includes hydrochloric acid.

According to several exemplary embodiments, the method further includes slurrying the ceramic micro-proppant particulates in the first fluid, the second fluid, or both, in a gel before introducing the first fluid, second fluid, or both into the formation.

According to several exemplary embodiments, yet another method of reducing pressure dependent leak-off (PDL) in PDL fractures of an unconventional subterranean formation is provided. The method includes introducing a first fluid including ceramic micro-proppant particulates having a size less than 149 µm into the formation via a wellbore, allowing a portion of the ceramic micro-proppant particulates in the first fluid to seal one or more PDL fractures in the formation, pumping an acid mixture including hydrochloric acid and hydrofluoric acid into the formation via the wellbore, allowing a portion of the ceramic micro-proppant particulates in the first fluid to divert a flow of at least a portion of the acid mixture from the PDL fractures to a primary fracture, introducing a second fluid including micro-proppant particulates having a size less than 149 µm into the formation via the wellbore, and allowing a portion of the ceramic micro-proppant particulates in the second fluid to seal one or more PDL fractures in the formation.

According to several exemplary embodiments, the ceramic micro-proppant particulates in the first fluid, second fluid, or both, have a diameter that is less than 74 µm.

Figure 1:
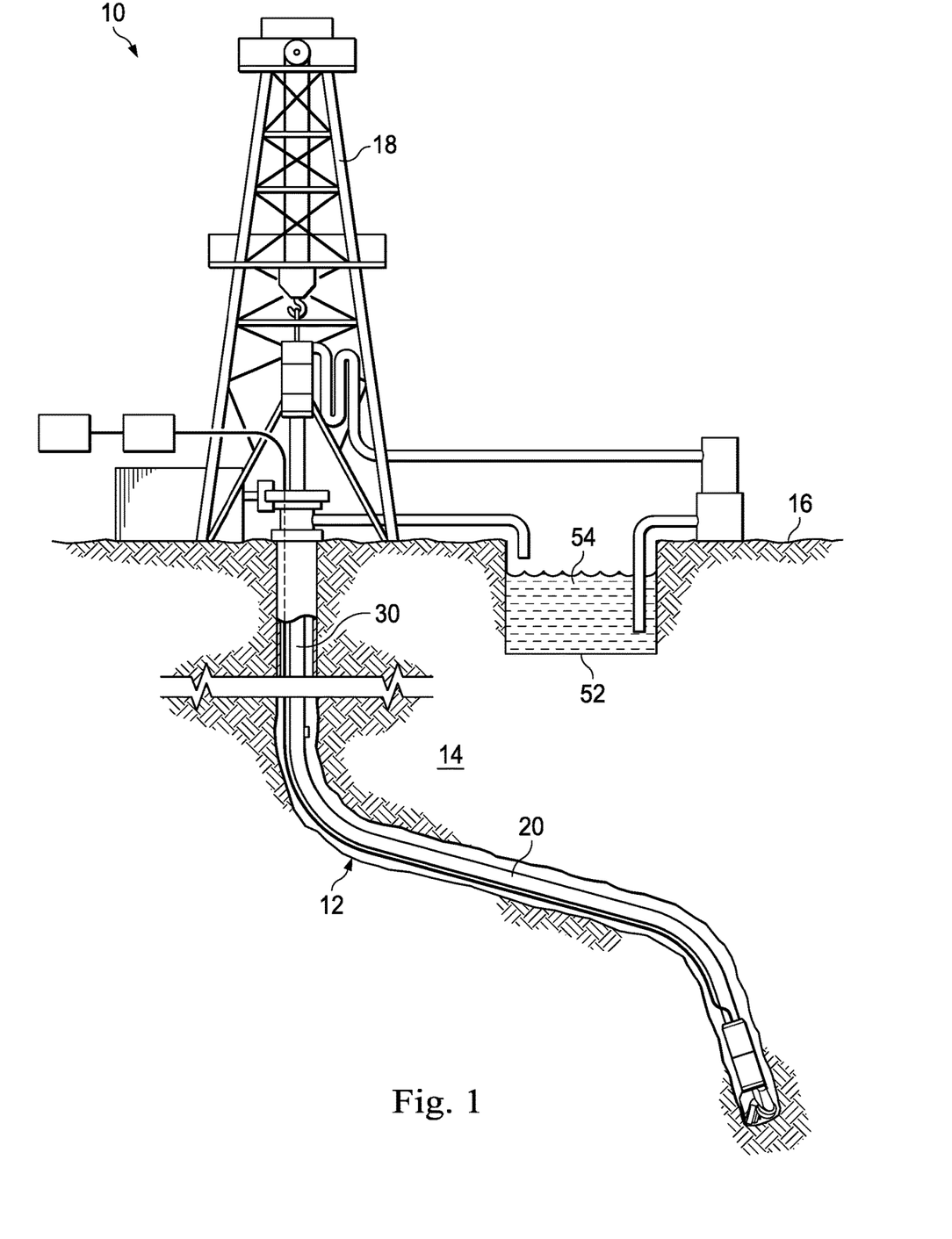
FIG. 1 illustrates a land-based drilling and production system.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, slurry, acidizing fluid (e.g., HF/HCl, HCl, or an HCl mixture), liquid water, steam, hydraulic fracturing fluid, propane, nitrogen, carbon dioxide or some other type of fluid.

According to several exemplary embodiments, the methods of the present invention use micro-proppant as a diverting agent to prevent or reduce fluid loss into the secondary PDL fracture network in unconventional formations, such as tight sandstone. As used herein, "PDL" means pressure dependent fluid leak-off into the secondary fracture network of the primary hydraulic fracture. As used herein, "PDL fractures" means secondary natural fractures that are a part of the in situ reservoir or secondary fractures generated during hydraulic fracturing. These fractures propagate perpendicular to the maximum horizontal stress or in a direction that deviates from the maximum horizontal stress. They take liquid from the primary hydraulic fracture and require elevated pressure to stay open. The elevated pressure often translates into higher breakdown/fracture initiation pressure and fracture extension pressures for the primary hydraulic fractures.

As used herein, "unconventional formations" or "unconventional reservoirs" means any reservoir with permeability so low (generally less than 0.1 millidarcy (mD)) that horizontal hydraulically fractured wells or other advanced completion techniques must be utilized to extract hydrocarbons at commercial rates. Unconventional reservoirs include reservoirs such as tight-gas sandstones, carbonates, gas and oil shales, coalbed methane, heavy oil and tar sands, and gas-hydrate deposits. These reservoirs require assertive recovery solutions such as stimulation treatments or steam injection, and innovative solutions that must overcome economic constraints in order to make recovery from these reservoirs monetarily viable.

Thus, subterranean treatment operations of unconventional reservoirs are typically supplemented with enhanced oil recovery techniques. Such enhanced oil recovery techniques may operate to enhance the conductivity of fractures. One such technique is acidizing, which involves injecting an acid (e.g., HCl and/or HF) into a subterranean formation in order to etch channels or create microfractures in the face of the formation and/or within an existing macrofracture or microfracture, thereby enhancing the conductivity of the formation. The acid may create a branched, dendritic-like network of channels through which produced fluids may flow.

According to several exemplary embodiments, the methods described herein encompass blocking the PDL fractures to potentially improve recovery from the subterranean formation. According to several exemplary embodiments, the PDL fractures are small. Typical proppants used in hydraulic fracturing stimulation, having a size in the range of 100 to 12 mesh (149-1680 μm), cannot invade the PDL fractures, and therefore, will not block or otherwise obstruct the PDL fractures. Thus, micro-proppants smaller than 100 mesh (149 μm), and in certain instances equal to or smaller than 200 mesh (74 μm), 230 mesh (63 μm) or even 325 mesh (44 μm), are used to block the PDL fractures. According to several exemplary embodiments, the size of the micro-proppant can be selected in relation to the size of the PDL fractures to be blocked, such that the particle size is smaller than the transverse dimension of the PDL fracture. The fine mesh proppant used in the methods of the present invention may be such that at least 90 weight percent is smaller than an upper limit selected from about 150 μm (100 mesh), about 125 μm (120 mesh), about 105 μm (140 mesh), about 88 μm (170 mesh), about 74 μm (200 mesh), about 63 μm (230 mesh), about 53 μm (270 mesh), about 44 μm (325 mesh), and about 37 μm (400 mesh). As used herein, the term "micro-proppant particulates" and all of its variants (e.g., "micro-proppant") refers to particulates capable of blocking PDL fractures after a hydraulic fracturing treatment and having a size in the range of from a lower limit of about 1 μm, 10 μm, 20 μm, 30 μm, 40 μm, 50 μm, 60 μm, 70 μm, and 80 μm to an upper limit of about 150 μm, 140 μm, 130 μm, 120 μm, 110 μm, 100 μm, 90 μm, and 80 μm. According to several exemplary embodiments, larger proppants (e.g., proppants having a size of 100 mesh or larger), are utilized in conjunction with the micro-proppant.

Suitable fine mesh or larger proppant materials can include sand, gravel, glass beads, ceramics, bauxites, glass, and the like or combinations thereof. In an embodiment, the fine mesh proppant material can be selected from ceramic, silica, muscovite, biotite, limestone, Portland cement, talc, kaolin, barite, fly ash, pozzolan, alumina, zirconia, titanium oxide, zeolite, graphite, carbon black, aluminosilicates, biopolymer solids, synthetic polymer solids, and the like, including combinations and mixtures thereof. Thus, various proppant materials like plastic beads such as styrene divinylbenzene, and particulate metals may be used. Other proppant materials may be materials such as drill cuttings that are circulated out of the well. Also, naturally occurring particulate materials may be used as fine mesh or larger proppants, including, but not necessarily limited to: ground or crushed shells of nuts such as walnut, coconut, pecan, almond, ivory nut, and brazil nut; ground or crushed seed shells (including fruit pits) of seeds of fruits such as plum, olive, peach, cherry, and apricot; ground or crushed seed shells of other plants such as maize (e.g., corn cobs or corn kernels); processed wood materials such as those derived from woods such as oak, hickory, walnut, poplar, and mahogany, including such woods that have been processed by grinding, chipping, or other form of comminution and processing, some nonlimiting examples of which are proppants made of walnut hulls impregnated and encapsulated with resins. Resin coated (various resin and plastic coatings) or encapsulated proppants having a base of any of the previously listed propping materials such as sand, ceramics, bauxite, and nut shells may be used in accordance with embodiments of the present invention. According to several exemplary embodiments, micro-proppants as described in U.S. Pat. No. 8,985,213, which is incorporated herein by reference, are used.

According to several exemplary embodiments, the micro-proppant includes ceramic microspheres smaller than 100 mesh, for example smaller than 200 mesh. According to several exemplary embodiments, the ceramic microspheres have the following particle size distribution:

TABLE 1

| D10 (μm) | D50 (μm) | D90 (μm) |
| --- | --- | --- |
| 9.43 | 29.7 | 110 |

According to several exemplary embodiments, the micro-proppant particulates are introduced into a wellbore in a pad fluid. In hydraulic fracturing, a fracturing fluid is injected through a wellbore to the formation to be treated at a rate and pressure at least sufficient to initiate and/or extend a fracture into the formation. Generally, a pad fluid is injected initially to establish formation breakdown (i.e., to initiate the fracture) and injectivity. The pad fluid is typically free of any proppants. According to several exemplary embodiments, however, the pad fluid includes a micro-proppant.

Examples of pad fluids include water, light brines, dilute acids, or water thickened with a polymeric viscosifier (e.g., guar, hydroxypropylguar, xanthan gum, polyacrylamide, and hydroxyethylcellulose) or an oil-in-water emulsion of a light hydrocarbon (e.g., kerosene and diesel oil). The pad fluids may include additional additives as deemed appropriate by one of ordinary skill in the art such as de-emulsifiers, surfactants, salts, crosslinking agents, clay inhibitors, iron-control additives, breakers, bactericides, and caustic.

According to several exemplary embodiments, the micro-proppant is slurried in a viscous gel so that it can be pumped into the wellbore as a liquid additive. According to several exemplary embodiments, use of the gel helps to deliver the fine mesh micro-proppant to the PDL fractures.

According to several exemplary embodiments, the micro-proppant particulates are present in the pad fluid in an amount in the range of from a lower limit of about 0.01 pounds per gallon ("ppg"), 0.025 ppg, 0.05 ppg, 0.075 ppg, 0.1 ppg, 0.125 ppg, 0.15 ppg, 0.175 ppg, 0.2 ppg, 0.225 ppg, and 0.25 ppg to an upper limit of about 0.5 ppg, 0.475 ppg, 0.45 ppg, 0.425 ppg, 0.4 ppg, 0.375 ppg, 0.35 ppg, 0.325 ppg, 0.3 ppg, 0.275 ppg, and 0.25 ppg of the pad fluid. According to several exemplary embodiments, any macro-proppant particulates may be present in a fracturing fluid in an amount in the range of from a lower limit of about 0.1 ppg, 0.5 ppg, 1 ppg, 1.5 ppg, 2 ppg, 2.5 ppg, and 3 ppg to an upper limit of about 6 ppg, 5.5 ppg, 5 ppg, 4.5 ppg, 4 ppg, 3.5 ppg, and 3 ppg of the fracturing fluid.

According to several exemplary embodiments, the hydraulic fracturing treatment may be performed in one or more stages, where different amounts, sizes, and/or concentrations of proppant (including micro as well as larger proppant) or, in some stages, no proppant, is provided into the primary and PDL fractures. For example, in certain instances, the fractures can be initiated with a fracturing fluid containing little or no proppant, then subsequent stages can provide the proppant to the fractures in a manner that fills the PDL fractures and keep the primary fractures open. Given the small size of the PDL fractures, one or more of the stages may introduce a micro-proppant such that the particle size is smaller than the transverse dimension of the fracture.

According to several exemplary embodiments, the micro-proppant is smaller than 100 mesh (149 μm), and smaller than 200 mesh (74 μm). The stages provide proppant such that the PDL fractures are blocked by the micro-proppant so that fracturing fluid (or other treatment fluid) is directed to the primary fracture.

According to several exemplary embodiments, the stages can provide larger proppant to prop the primary fractures. The stages can be arranged to provide the proppant and micro-proppant intermixed and/or some stages can provide substantially just micro-proppant and other stages can provide just larger proppant.

Figure 2A:
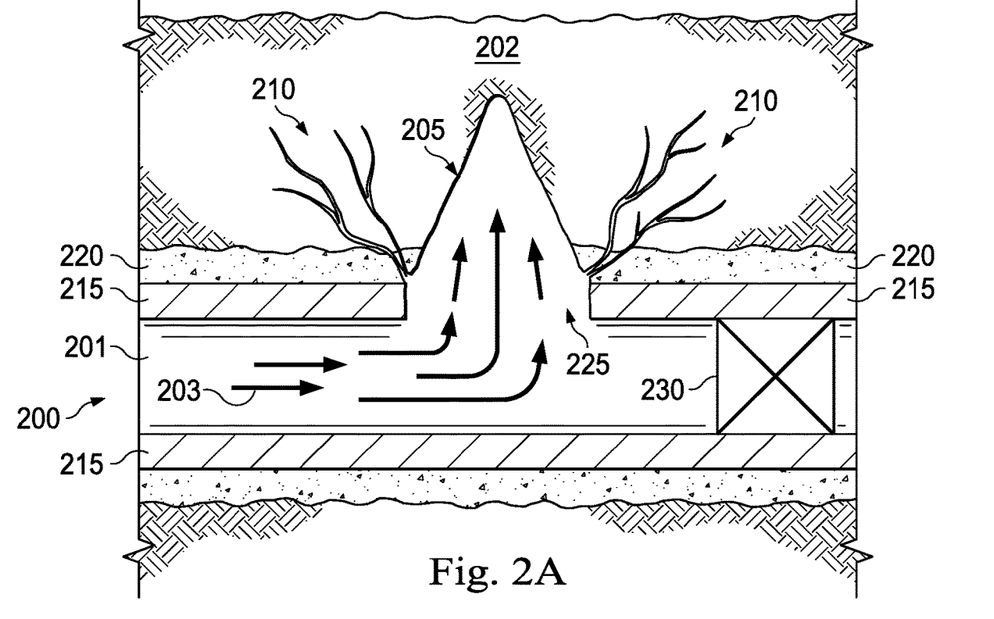
FIGS. 2A-2D illustrate treatment of a zone of an unconventional subterranean formation according to embodiments of the present invention.

Turning now to FIG. 2A, shown is a zone 200 of a wellbore 201 formed through a subterranean formation 202 after hydraulic fracturing and before acid 203 (e.g., an HF/HCl mixture) reaches a primary hydraulic fracture 205 and PDL fractures 210. According to several exemplary embodiments, a HF/HCl mixture that is 7.5% HCl/1.5% HF is used. The HF acid mixture is primarily meant to improve breakdown of the sandstone and any other minerals in the formation and improve fracture initiation. According to several exemplary embodiments, an HCl mixture or straight HCl is used. HCl is used to improve breakdown of carbonate formations.

Although the wellbore 201 is shown as deviating to horizontal, the wellbore 201 may include horizontal, vertical, slant, curved, and other types of wellbore geometries and orientations, and fluid may be applied to a subterranean zone surrounding any portion of the wellbore 201. The zone 200 includes a casing 215 that is secured within the wellbore 201 by cement 220 or other means. The wellbore 201 can be uncased or include uncased sections. Perforations 225 formed in the casing 215 allow fracturing fluids and/or other materials to flow into the zone 200. In cased wells, perforations 225 can be formed using shaped charges, a perforating gun, hydro jetting and/or other tools. A plug 230 is placed in the wellbore 201 to separate various production zones for stimulation such as fracturing or acid treatment.

According to several exemplary embodiments, the rock matrix of the zone 200 is of a type that when fractured, produces both a primary fracture 205 in the near field and PDL fractures 210 in the far field. As shown, the PDL fractures 210 have propagated from or near the ends and edges of the primary fracture 205. In certain instances, the zone 200 is a low permeability zone having a permeability of 1 mD or less. For example, the zone 200 can be shale or tight sandstone.

Figure 2B:
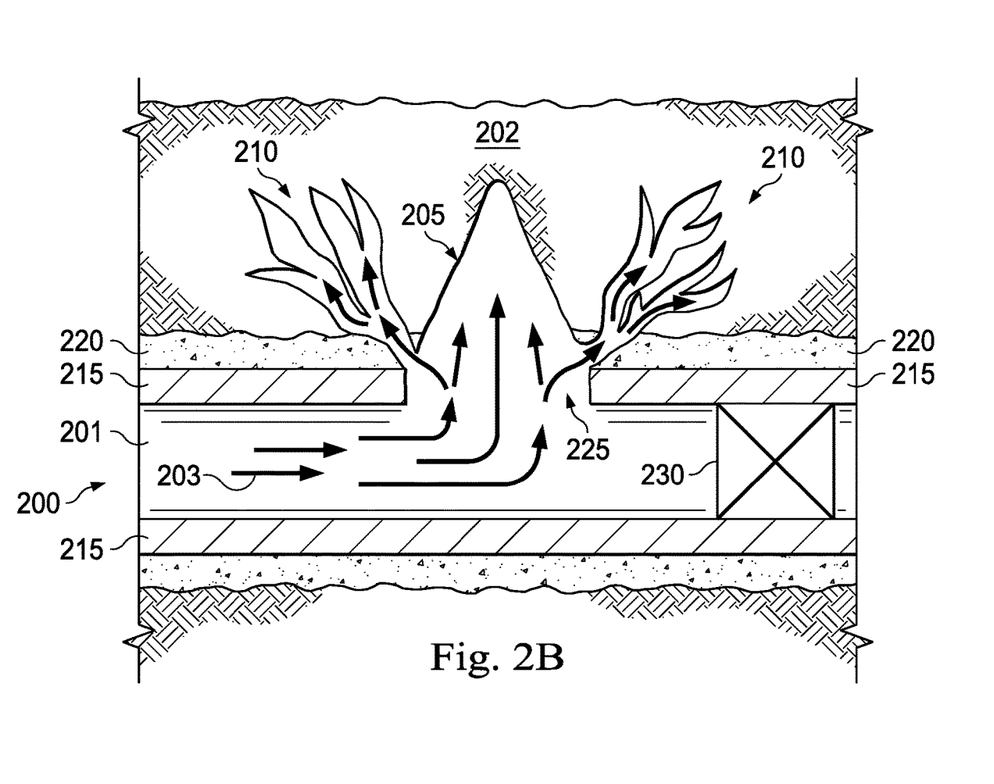

According to several exemplary embodiments, acid 203 is pumped into the wellbore 201 and flows into both the primary fracture 205 and the PDL fractures 210. FIG. 2B illustrates the zone 200 after the acid 203 enters the zone 200 and contacts the hydraulic fracture face. The acid 203 causes the PDL fractures 210 to dilate or become larger with the result that the acid 203 intended for the primary hydraulic fracture 205 is diverted to the dilated PDL fractures 210.

Figure 2C:
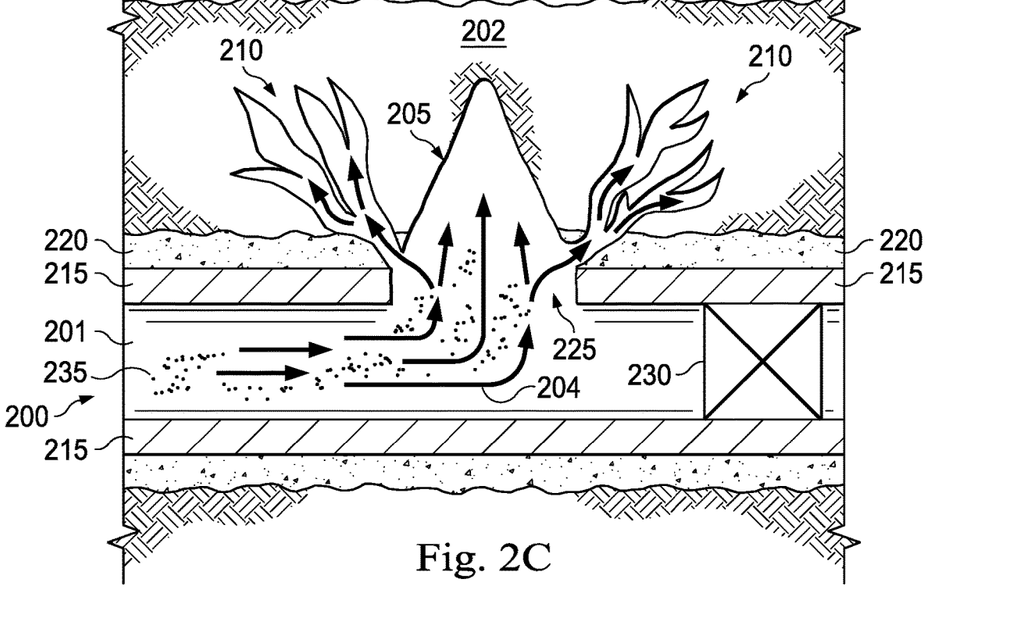

FIG. 2C illustrates the zone 200 after the acid treatment and before micro-proppant treatment. As shown, the micro-proppant particulates 235 are pumped into the wellbore 201 in a fluid 204 and travel to both the primary fracture 205 and the PDL fractures 210. According to several exemplary embodiments, the micro-proppant particulates 235 are introduced into the wellbore 201 in any suitable kind of fluid 204, for example, a gel.

Figure 2D:
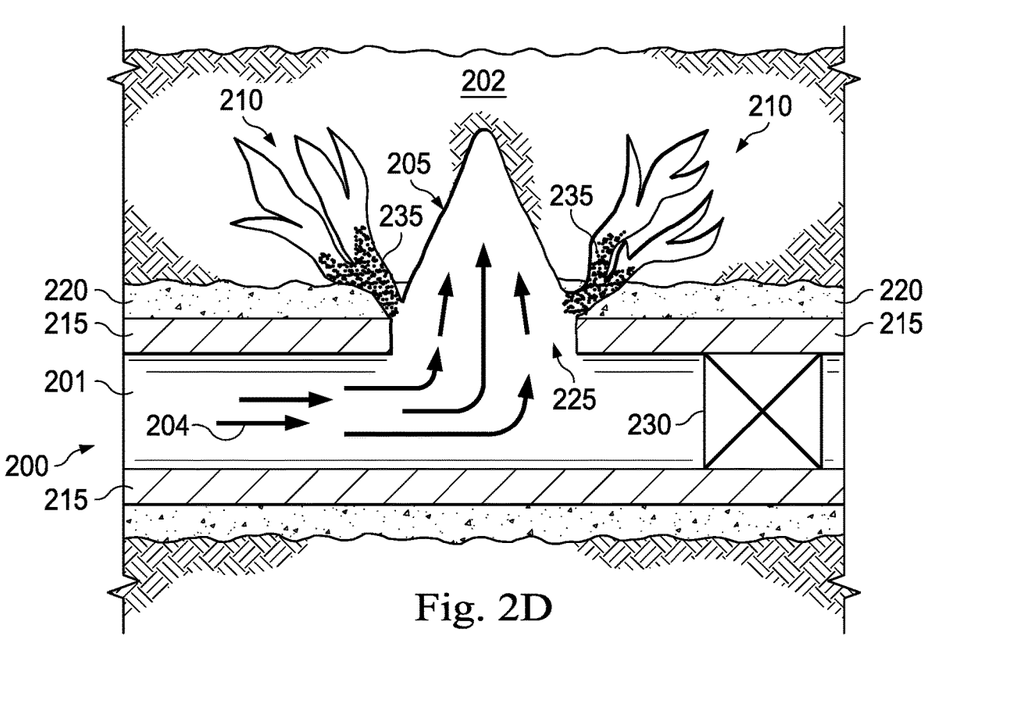

FIG. 2D illustrates the zone 200 after the micro-proppant treatment in FIG. 2C. After micro-proppant treatment, the PDL fractures 210 are "stopped up" with the micro-proppant particulates 235 so that the PDL fractures 210 are no longer taking fluid 204. That is, there is bridging off of the PDL fractures 210 with the micro-proppant 235 so that no fluid 204 enters the PDL fractures 210. The fracturing fluid treatment flow now goes to the primary hydraulic fracture 205 to propagate the primary hydraulic fracture 205. In this way, PDL is reduced and a dominant fracture is created.

Figure 3:
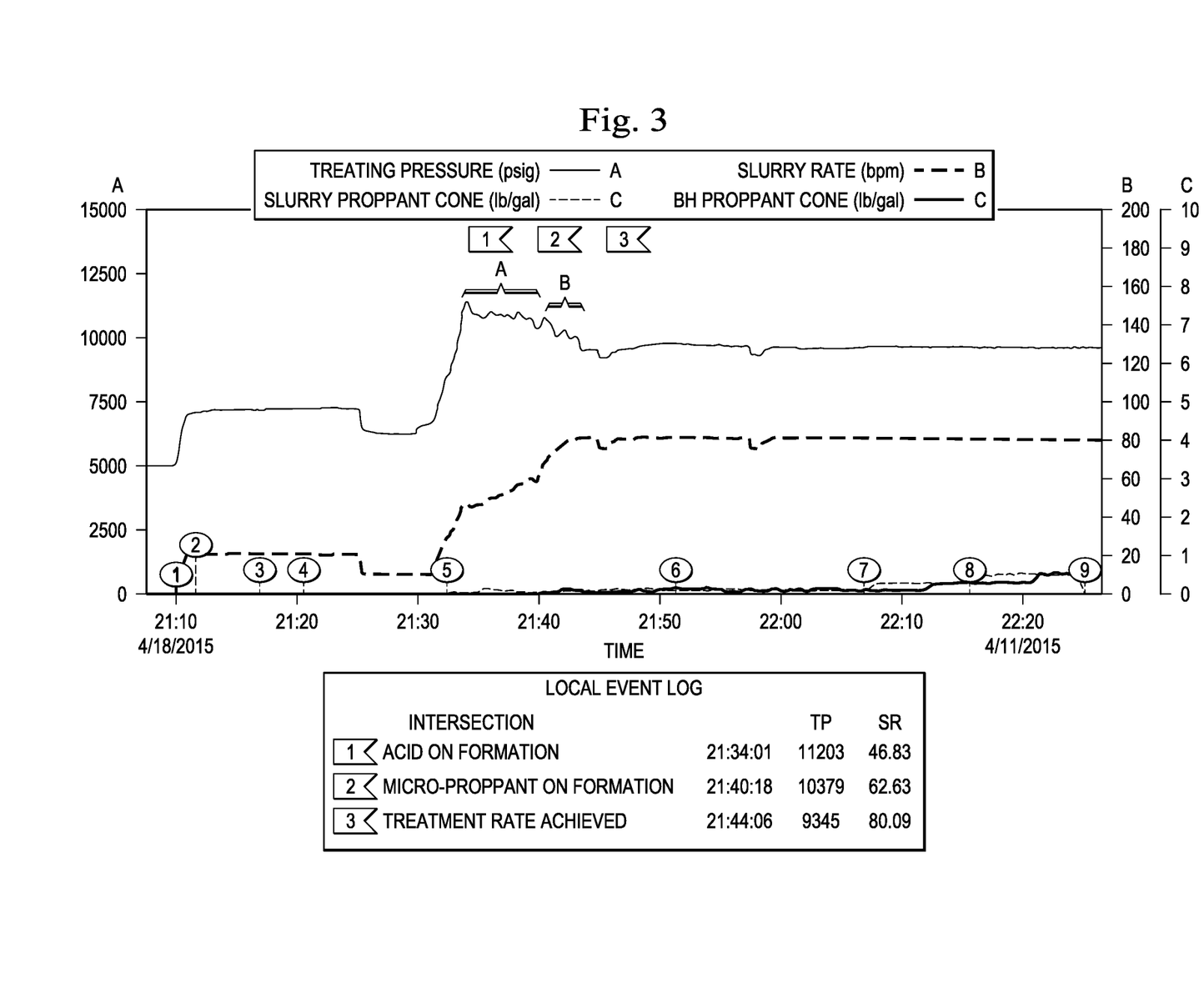
FIG. 3 illustrates treating pressure responses according to embodiments of the present invention.

FIG. 3 illustrates treating pressure responses when acid 203 and micro-proppant 235 contact the subterranean formation 202. The pressure drop between flags 1 and 2 is a result of the acid 203 breaking down the formation 202 and reducing entry friction of the fluid. Better fracture development occurs after the acid 203 hits the formation 202 in FIG. 2B. One issue, however, is that the PDL fractures 210 also get better development. The PDL fractures 210 thieve fluid from the dominant hydraulic fracture 205 leading to a higher treating pressure being required to propagate the dominant fracture 205.

The pressure drop between flags 2 and 3 indicates PDL reduction due to the micro-proppant particulates 235 sealing the PDL fractures 210 and diverting fluid flow to the primary fracture 205. Because of their small size, the micro-proppant particulates 235 flow into the dilated PDL fractures 210 and seal them off so that fluid flow and pressure can be directed to the dominant hydraulic fracture 205 as seen in FIGS. 2C and 2D.

Figure 4:
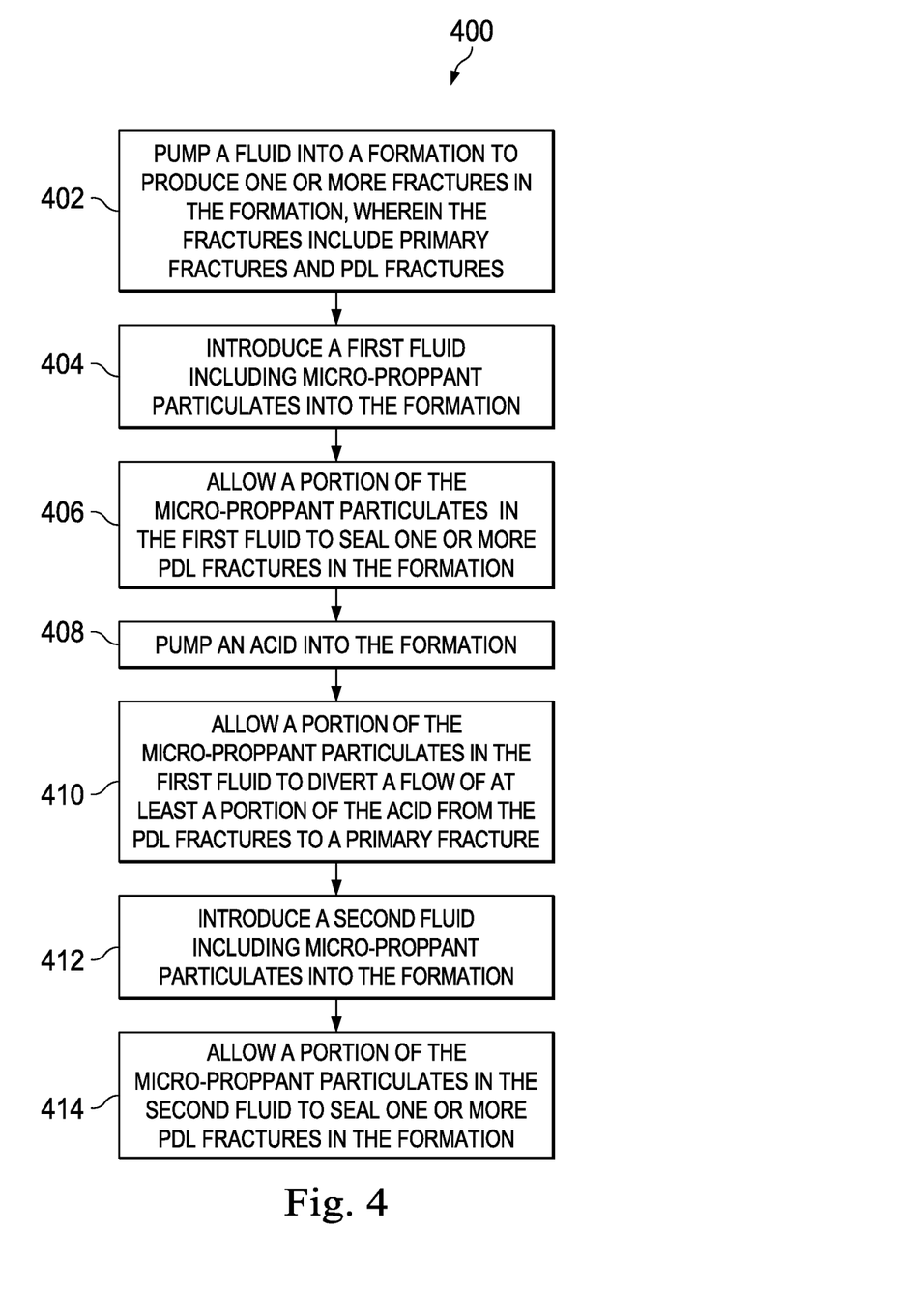
FIG. 4 depicts a method of reducing PDL in PDL fractures of an unconventional subterranean formation according to embodiments of the present invention.

According to several exemplary embodiments, a method of reducing PDL in PDL fractures of an unconventional subterranean formation is provided. Turning now to FIG. 4, the method 400 includes pumping fluid into the formation to produce one or more fractures in the formation, wherein the fractures include primary fractures and PDL fractures in step 402, introducing a first fluid including micro-proppant particulates into the formation in step 404, allowing a portion of the micro-proppant particulates in the first fluid to seal one or more PDL fractures in the formation in step 406, pumping an acid (e.g., straight acid or an acid mixture) into the formation in step 408, allowing a portion of the micro-proppant particulates in the first fluid to divert a flow of at least a portion of the acid from the PDL fractures to a primary fracture in step 410, introducing a second fluid including micro-proppant particulates into the formation in step 412, and allowing a portion of the micro-proppant particulates in the second fluid to seal one or more PDL fractures in the formation in step 414. The term "introducing," as used herein, includes pumping, injecting, pouring, releasing, displacing, spotting, circulating, or otherwise placing a fluid or material within a well, wellbore, or subterranean formation using any suitable manner known in the art.

If secondary fissures open before the fracture initiation pressure is achieved, the ability of the stimulation liquid to break down the formation will be significantly hindered. According to several exemplary embodiments, the micro-proppant includes ceramic spheres, and the micro-proppant is pumped ahead of the acid to bridge off and seal any PDL fractures before the acid reaches the formation. This initial micro-proppant stage is meant to be sacrificial to an extent. Because of the nature of acid, it dissolves at least a portion of the ceramic micro-proppant. Advantageously, the PDL fracture network remains primarily untouched by the acid in these embodiments, thus more of the acid can be directed to the dominant hydraulic fracture. Also, because of the size of the micro-proppant particles, the risk of screenout is low when pumping ahead of acid. If any PDL fractures still remain open after the acid treatment, then a second micro-proppant treatment bridges inside the PDL fractures and seals them off allowing for better fracture extension of the dominant hydraulic fractures. The second micro-proppant treatment has a secondary benefit in that it provides a propping agent for the PDL fractures that can contribute to production.

According to several exemplary embodiments, the PDL exacerbation or secondary fracture openings are a direct result of the acid and as a result, are not entirely pressure related. The micro-proppant treatment is still pumped behind the acid to bridge off and seal the induced PDL fractures and also act as a propping agent for those secondary fractures.

Advantageously, utilizing micro-proppant in conjunction with an acid gives the combined effect of adequately breaking down the formation and dealing with PDL quickly and early in the stage so that an efficient and effective treatment can be achieved. The added benefit of the micro-proppant is that it is small enough that the risk of screenout is low, and according to several exemplary embodiments, the micro-proppant is ceramic so it has high crush resistance, making it an ideal propping agent for the secondary fracture network in hard formations with high closure stresses.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of reducing pressure dependent leak-off (PDL) in PDL fractures of an unconventional subterranean formation comprising:
    before introducing an acid into the formation, introducing a first fluid comprising micro-proppant particulates into the formation, wherein the micro-proppant particulates have a diameter that is less than 149 µm;
    allowing a portion of the micro-proppant particulates in the first fluid to seal one or more PDL fractures in the formation;
    pumping an acid into the formation;
    allowing a portion of the micro-proppant particulates in the first fluid to divert a flow of at least a portion of the acid from the PDL fractures to a primary fracture;
    introducing a second fluid comprising micro-proppant particulates into the formation; and
    allowing a portion of the micro-proppant particulates in the second fluid to seal one or more PDL fractures in the formation.

2. The method of claim 1, wherein the micro-proppant particulates in the first fluid, the second fluid, or both, comprise ceramic microspheres.

3. The method of claim 2, wherein the ceramic microspheres have a diameter that is less than 74 µm.

4. The method of claim 1, wherein the acid comprises an acid mixture.

5. The method of claim 4, wherein the acid mixture comprises hydrochloric acid and hydrofluoric acid.

6. The method of claim 1, wherein introducing the first fluid and second fluid establish formation breakdown.

7. The method of claim 1, wherein the micro-proppant particulates are present in the first fluid, the second fluid, or both, at a concentration of about 0.1 parts per gallon (ppg).

8. The method of claim 1, further comprising introducing a fracturing fluid into the formation after allowing a portion of the micro-proppant particulates in the second fluid to seal one or more PDL fractures in the formation.

9. The method of claim 8, wherein the fracturing fluid comprises proppants having a diameter of at least 149 µm.

10. The method of claim 1, further comprising slurrying the micro-proppant particulates in a gel in the first fluid, the second fluid, or both, before introducing.

11. The method of claim 1, wherein a pump is used to introduce the first fluid, second fluid, or both, into the formation.

12. A method of reducing pressure dependent leak-off (PDL) in PDL fractures of an unconventional subterranean formation comprising:
    pumping a fluid into the formation to produce one or more fractures in the formation, wherein the fractures comprise primary fractures and PDL fractures;
    before introducing an acid into the formation, introducing a first fluid comprising ceramic micro-proppant particulates into the formation, wherein the ceramic micro-proppant particulates have a diameter that is less than 149 µm;
    allowing a portion of the ceramic micro-proppant particulates in the first fluid to seal one or more PDL fractures in the formation;
    pumping an acid mixture into the formation;
    allowing a portion of the ceramic micro-proppant particulates in the first fluid to divert a flow of at least a portion of the acid mixture from the PDL fractures to a primary fracture;
    introducing a second fluid comprising ceramic micro-proppant particulates into the formation; and
    allowing a portion of the ceramic micro-proppant particulates in the second fluid to seal one or more PDL fractures in the formation.

13. The method of claim 12, wherein the ceramic micro-proppant particulates in the first fluid, the second fluid, or both have a diameter that is less than 74 µm.

14. The method of claim 12, wherein the acid mixture comprises hydrochloric acid and hydrofluoric acid.

15. The method of claim 12, wherein the ceramic micro-proppant particulates are present in the first fluid, the second fluid, or both, at a concentration of about 0.1 parts per gallon (ppg).

16. The method of claim 12, further comprising slurrying the ceramic micro-proppant particulates in a gel in the first fluid, the second fluid, or both, before introducing.

17. The method of claim 12, wherein introducing the first fluid and second fluid establish formation breakdown.

18. A method of reducing pressure dependent leak-off (PDL) in PDL fractures of an unconventional subterranean formation comprising:
    before introducing an acid into the formation, introducing a first fluid comprising ceramic micro-proppant particulates having a diameter that is less than 149 µm into the formation;
    allowing a portion of the ceramic micro-proppant particulates in the first fluid to seal one or more PDL fractures in the formation;
    pumping an acid mixture comprising hydrochloric acid and hydrofluoric acid into the formation;
    allowing a portion of the ceramic micro-proppant particulates in the first fluid to divert a flow of at least a portion of the acid mixture from the PDL fractures to a primary fracture;
    introducing a second fluid comprising ceramic micro-proppant particulates having a diameter less than 149 µm into the formation; and
    allowing a portion of the ceramic micro-proppant particulates in the second fluid to seal one or more PDL fractures in the formation.

19. The method of claim 18, wherein the ceramic micro-proppant particulates in the first fluid, second fluid, or both, have a diameter that is less than 74 µm.

20. The method of claim 18, wherein introducing the first fluid and second fluid establish formation breakdown.

\* \* \* \* \*